US011050685B2

(12) United States Patent
Luo et al.

(10) Patent No.: US 11,050,685 B2
(45) Date of Patent: Jun. 29, 2021

(54) METHOD FOR DETERMINING CANDIDATE INPUT, INPUT PROMPTING METHOD AND ELECTRONIC DEVICE

(71) Applicant: TENCENT TECHNOLOGY (SHENZHEN) COMPANY LIMITED, Shenzhen (CN)

(72) Inventors: Ping Luo, Shenzhen (CN); Ganbin Zhou, Shenzhen (CN); Fen Lin, Shenzhen (CN); Yanxiong Lu, Shenzhen (CN); Rongyu Cao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 244 days.

(21) Appl. No.: 16/011,216

(22) Filed: Jun. 18, 2018

(65) Prior Publication Data
US 2018/0302350 A1 Oct. 18, 2018

Related U.S. Application Data

(63) Continuation of application No. PCT/CN2017/094953, filed on Jul. 28, 2017.

(30) Foreign Application Priority Data

Aug. 3, 2016 (CN) .......................... 201610630302.6

(51) Int. Cl.
*H04L 12/58* (2006.01)
*G06F 17/18* (2006.01)
(Continued)

(52) U.S. Cl.
CPC ............ *H04L 51/02* (2013.01); *G06F 3/0236* (2013.01); *G06F 3/0237* (2013.01);
(Continued)

(58) Field of Classification Search
CPC ...... G06F 17/18; G06F 17/274; G06F 17/276; G06F 17/2775; G06F 3/0236;
(Continued)

(56) References Cited

U.S. PATENT DOCUMENTS 7,657,423 B1    2/2010  Hark et al.
8,521,515 B1*   8/2013  Harik .................... G06F 40/274
                                                          704/9

(Continued)

FOREIGN PATENT DOCUMENTS

CN    101833547    9/2010
CN    103870449    6/2014
CN    104298672    1/2015

OTHER PUBLICATIONS

Nandi, Arnab, and H. V. Jagadish. "Effective phrase prediction." Proceedings of the 33rd international conference on Very large data bases. 2007. (Year: 2007).*
(Continued)

Primary Examiner — Philip J Chea
Assistant Examiner — Ruth Solomon
(74) Attorney, Agent, or Firm — Oblon, McClelland, Maier & Neustadt, L.L.P.

(57) ABSTRACT

A method for determining a candidate input is provided. Text that precedes and/or follows a current text input location in an input interface is acquired. A candidate sentence is acquired based on the text which is contained in a current sentence that corresponds to the current text input location. A preset number of possible conjunctions for the candidate sentence are determined based on occurrence probabilities of the possible conjunctions that are determined for the candidate sentence. The preset number of possible conjunctions are connected to the candidate sentence to obtain predicted candidate sentences. Occurrence probabilities of the predicted candidate sentences are calculated according to
(Continued)

the text that precedes and/or follows the current text input location. Further, a preset number of the predicted candidate sentences are provided based on the calculated occurrence probabilities of the predicted candidate sentences as candidate inputs.

18 Claims, 9 Drawing Sheets

(51) Int. Cl.
*G06F 3/0481* (2013.01)
*G06F 3/023* (2006.01)
*G06F 3/0488* (2013.01)
*G06F 40/253* (2020.01)
*G06F 40/274* (2020.01)
*G06F 40/289* (2020.01)

(52) U.S. Cl.
CPC ...... *G06F 3/04812* (2013.01); *G06F 3/04886* (2013.01); *G06F 17/18* (2013.01); *G06F 40/253* (2020.01); *G06F 40/274* (2020.01); *G06F 40/289* (2020.01); *H04L 51/20* (2013.01)

(58) Field of Classification Search
CPC ............. G06F 3/0237; G06F 3/04812; G06F 3/04886; G06F 3/04; G06F 3/02; G06F 17/27; H04L 51/02; H04L 51/20
See application file for complete search history.

(56) References Cited

U.S. PATENT DOCUMENTS

| | | | | |
|---|---|---|---|---|
| 9,176,941 | B2* | 11/2015 | Xiao | G06F 40/129 |
| 9,606,988 | B2* | 3/2017 | Andreoli | G06F 40/51 |
| 2011/0105190 | A1 | 5/2011 | Cha et al. | |
| 2014/0104175 | A1 | 4/2014 | Ouyang et al. | |
| 2014/0136970 | A1* | 5/2014 | Xiao | G06F 40/40 |
| | | | | 715/271 |
| 2015/0317069 | A1* | 11/2015 | Clements | G06F 3/04886 |
| | | | | 715/773 |
| 2015/0350118 | A1* | 12/2015 | Yang | G06F 3/0488 |
| | | | | 715/752 |
| 2015/0370780 | A1* | 12/2015 | Wang | G06F 40/274 |
| | | | | 704/9 |
| 2016/0124944 | A1* | 5/2016 | Andreoli | G06F 40/51 |
| | | | | 704/2 |
| 2017/0220129 | A1* | 8/2017 | Wu | G06F 40/274 |
| 2017/0270092 | A1* | 9/2017 | He | G06F 40/30 |
| 2019/0332663 | A1* | 10/2019 | Zhang | G06F 40/205 |

OTHER PUBLICATIONS

International Search Report dated Nov. 8, 2017 in PCT/CN2017/094953 filed Jul. 28, 2017. (With English Translation).
European Search Report dated Jun. 25, 2019 in Application No. 17836348.7, (10 pages).

* cited by examiner

METHOD FOR DETERMINING CANDIDATE INPUT, INPUT PROMPTING METHOD AND ELECTRONIC DEVICE

RELATED APPLICATION

This application is a continuation of International Application No. PCT/CN2017/094953, filed on Jul. 28, 2017, which claims priority to Chinese Patent Application No. 201610630302.6, entitled "Method and Apparatus for Determining Candidate Input, and Input Prompting Method and Apparatus" filed on Aug. 3, 2016. The entire disclosures of the prior applications are hereby incorporated by reference in their entirety.

FIELD OF THE TECHNOLOGY

The present disclosure relates to the technical field of Internet, and to a method for determining a candidate input, an input prompting method, and an electronic device.

BACKGROUND OF THE DISCLOSURE

With the development of smart terminal devices such as personal computers and mobile phones, more and more occasions, such as chatting and report writing, require people to edit texts by using terminal devices.

In order to improve the input efficiency of a user, some input methods provide candidate inputs for the user according to a text input by the user. For example, when the user inputs "Hello", the input method provides the user with "?", "!" and other candidate inputs for the user to select. The candidate inputs provided by the input methods are generated according to common sentences and input records of the user, and are usually single words or phrases. In the case where a user needs to input a longer sentence, e.g., the user needs to input "It is raining outside now, remember to bring an umbrella", when the user inputs "now", an input method provides candidate options for the user to input, but because "outside now" is not a regular word, the candidate options do not include an option of "outside", so the user inputs a word "out", and the candidate options provided by the input method will include a word "side" for the user to select according to the word "out" input by the user. After the user selects the word "side", if the user has repeatedly input "raining outside", the candidate options provided by the input method may include an option of "raining", and after the user selects "raining", the provided candidate options include an option of punctuation ",". After the user selects ",", no candidate option is provided, the user inputs "remember", the candidate inputs provided by the input method do not include an option of "bring an umbrella" according to "remember" input by the user, and the user inputs "bring an umbrella" manually to complete input.

Thus, when a user inputs a longer sentence by using a related input method, multiple inputs and selections are required for completion, thereby resulting in low input efficiency.

SUMMARY

According to various embodiments of the present application, a method for determining a candidate input, an input prompting method, and an electronic device are provided.

In one embodiment, a method is provided. Text that precedes and/or follows a current text input location in an input interface is acquired by processing circuitry of an electronic device. The text contains less than or equal to a preset number of words. A candidate sentence is acquired by the processing circuitry based on the text which is contained in a current sentence that corresponds to the current text input location. A preset number of possible conjunctions for the candidate sentence are determined by the processing circuitry based on occurrence probabilities of the possible conjunctions that are determined for the candidate sentence. When an end condition for updating the candidate sentence is satisfied, the preset number of possible conjunctions having end identifiers are connected by the processing circuitry to the candidate sentence to obtain predicted candidate sentences having the end identifiers. Occurrence probabilities of the predicted candidate sentences having the end identifiers are calculated by the processing circuitry according to the text that precedes and/or follows the current text input location. A preset number of the predicted candidate sentences having the end identifiers are provided by the processing circuitry based on the calculated occurrence probabilities of the predicted candidate sentences as candidate inputs.

Further, in one embodiment of the method, the candidate inputs are displayed at corresponding locations of a cursor in the input interface.

In one embodiment, an electronic device is provided. The electronic device includes processing circuitry that acquires text that precedes and/or follows a current text input location in an input interface, the text containing less than or equal to a preset number of words. The processing circuitry acquires a candidate sentence based on the text which is contained in a current sentence that corresponds to the current text input location, and determines a preset number of possible conjunctions for the candidate sentence based on occurrence probabilities of the possible conjunctions that are determined for the candidate sentence. The processing circuitry connects, when an end condition for updating the candidate sentence is satisfied, the preset number of possible conjunctions having end identifiers to the candidate sentence to obtain predicted candidate sentences having the end identifiers. The processing circuitry calculates occurrence probabilities of the predicted candidate sentences having the end identifiers according to the text that precedes and/or follows the current text input location. Further, the processing circuitry provides a preset number of the predicted candidate sentences having the end identifiers based on the calculated occurrence probabilities of the predicted candidate sentences as candidate inputs.

Further, in one embodiment of the electronic device, the processing circuitry displays candidate inputs at corresponding locations of a cursor in the input interface.

The details of one or more embodiments of the present disclosure are set forth in the accompanying drawings and the description below. Other features, objectives, and advantages of the present disclosure will be apparent from the specification, the accompanying drawings and the claims.

BRIEF DESCRIPTION OF THE DRAWINGS

To describe the technical solutions of the embodiments of the present application, the following briefly introduces the accompanying drawings required for describing the embodiments. The accompanying drawings in the following description show only some embodiments of the present application, and a person of ordinary skill in the art may still derive other drawings from these accompanying drawings.

DESCRIPTION OF EMBODIMENTS

To make the objectives, technical solutions, and advantages of the present disclosure clearer, the following further describes the present disclosure in detail with reference to the accompanying drawings and embodiments. It will be appreciated that the embodiments described herein are merely used to explain the present disclosure and do not limit the protection scope of the present disclosure.

Figure 1:
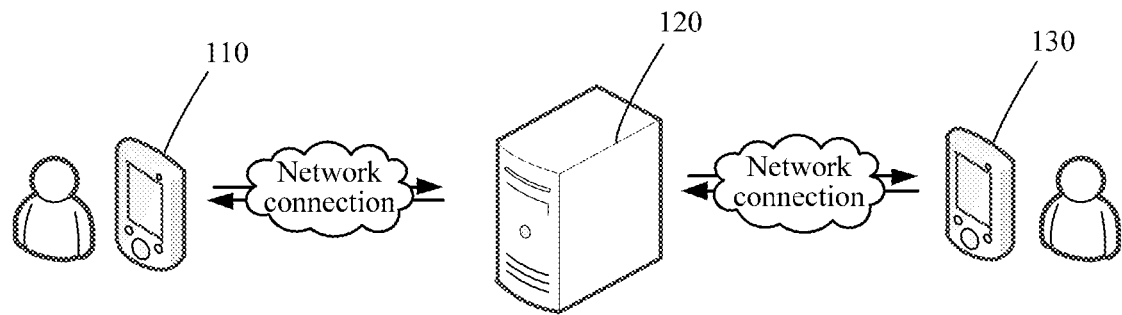
FIG. 1 is an application environment diagram of a method for determining a candidate input in an embodiment.

FIG. 1 is an application environment diagram of a method for determining a candidate input in an embodiment. As shown in FIG. 1, the application environment includes a first terminal 110, a server 120 and a second terminal 130. The first terminal 110 and the second terminal 130 communicate with the server 120 via a network. A first user logs in an application client on the first terminal 110 to chat with a second user logging in the second terminal 130. When the terminals or the server acquires a preset number of preceding texts input by the first user at a current input location and an input text of an input box, candidate inputs are determined according to the input text of the input box and the preceding texts.

Figure 2:
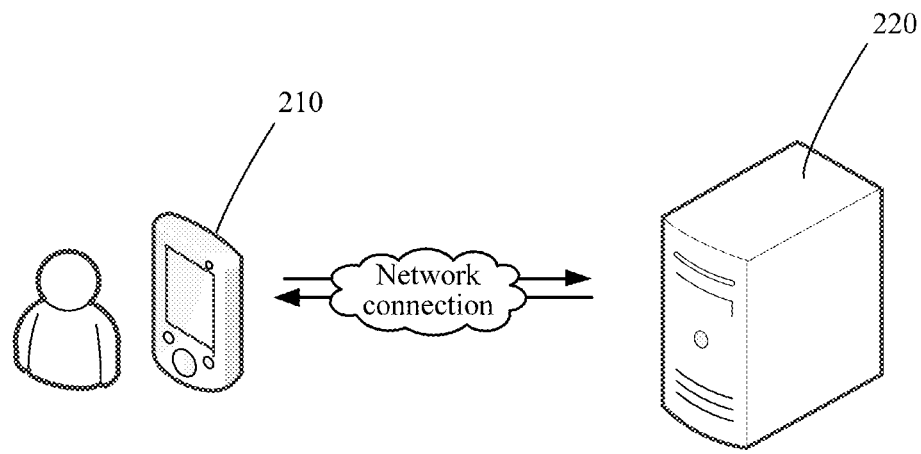
FIG. 2 is an application environment diagram of a method for determining a candidate input in another embodiment.

FIG. 2 is an application environment diagram of a method for determining a candidate input in another embodiment. As shown in FIG. 2, a first terminal 210 and a server 220 are included. A first user inputs, e.g., edits, a text on the first terminal 210. When the terminal or the server acquires a preset number of preceding texts and/or following texts input by the first user at a current input location and an input text of a current sentence corresponding to the current input location, candidate inputs are determined according to the input text of an input box, the preceding texts and/or the following texts. If the candidate inputs are determined on the server 220, the server 220 sends, after the candidate inputs are determined, the determined candidate inputs to the first terminal 210. An application environment of a method for determining a candidate input in another embodiment may only include a first terminal. For example, during text editing, when the terminal acquires a preset number of preceding texts and/or following texts input by a user at a current input location and an input text of a current sentence corresponding to the current input location, candidate inputs are determined according to the input text of an input box, the preceding texts and/or the following texts.

Figure 3:
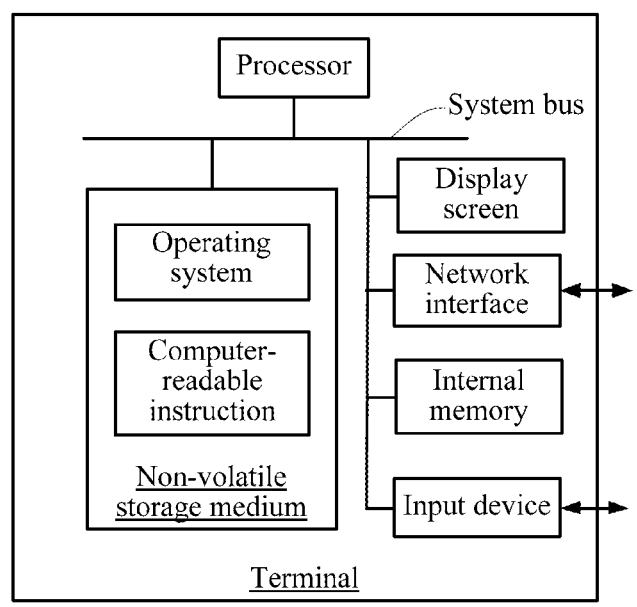
FIG. 3 is an internal structure diagram of a terminal in an embodiment.

FIG. 3 is an internal structure diagram of a terminal in an embodiment. As shown in FIG. 3, the terminal includes a processor, a non-volatile storage medium, a display screen, an internal memory, a network interface and an input device, which are connected via a system bus. The storage medium of the terminal stores an operating system and also stores a computer-readable instruction. When the computer-readable instruction is executed by the processor, the processor is enabled to implement a method for determining a candidate input. The processor is configured to provide calculative and control abilities, and supports running of the whole terminal. The internal memory in the terminal provides a cached operating environment for the operating system and the computer-executable instruction in the non-volatile storage medium. The network interface is configured to perform network communication with a server, for example, sending a text input by a user to the server, and receiving an input text sent by a chat object and returned by the server. The input device is configured to accept the user input. The display screen of the terminal may be a liquid crystal display screen or an electronic ink display screen. The input device may be a touch layer overlaid on the display screen, may be a key, a trackball or a touchpad disposed on a housing of the terminal, or may be an external keyboard, touchpad or mouse. The terminal may be a mobile phone, a tablet computer, a personal digital assistant or a wearable device. Those skilled in the art may understand that the structure shown in FIG. 3 is merely a block diagram of a partial structure related to the solution of the present application, and does not constitute a limitation to the terminal to which the solution of the present application is applied, and a specific terminal may include components more or fewer than those shown in the figure, or some combined components, or different component arrangements.

Figure 4:
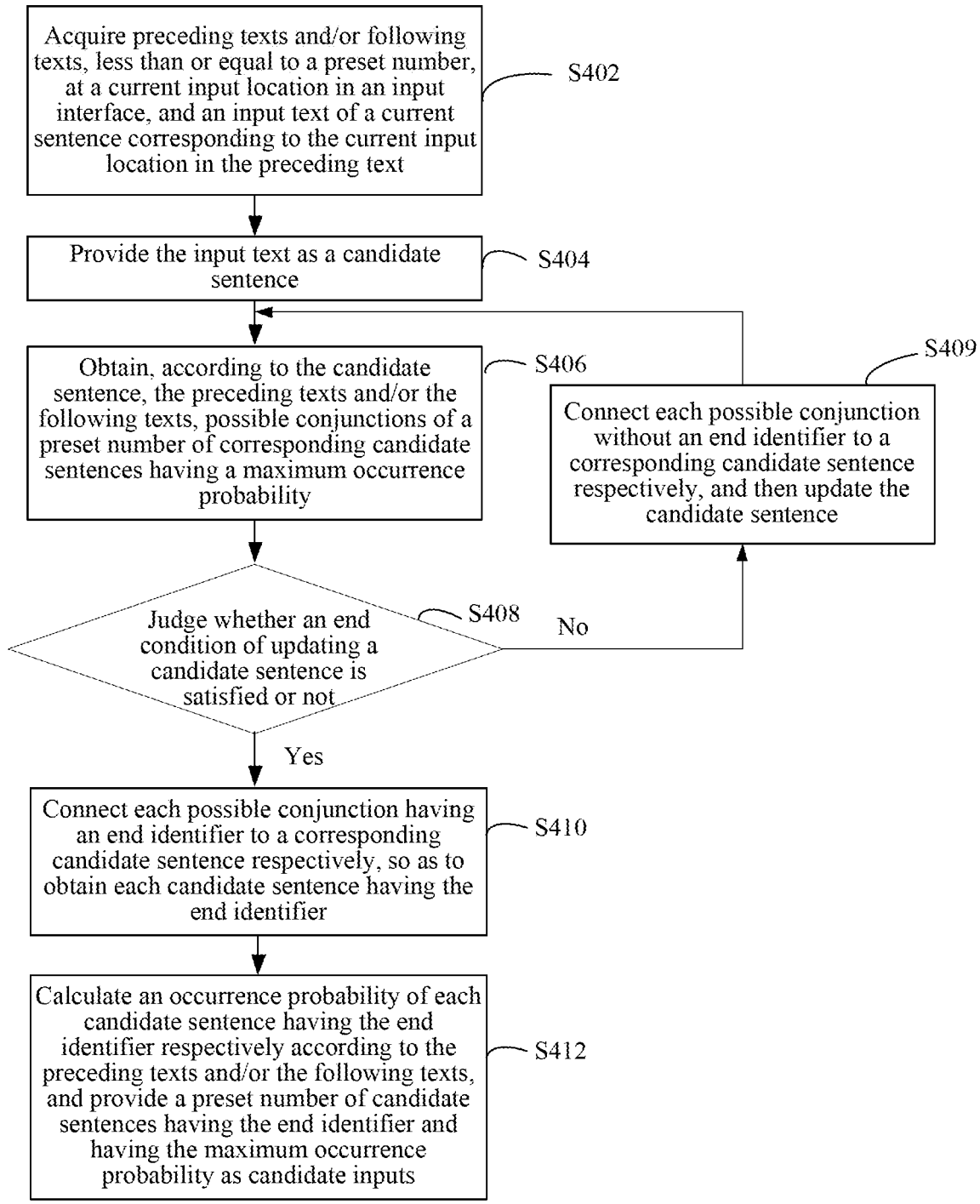
FIG. 4 is a flowchart of a method for determining a candidate input in an embodiment.

FIG. 4 is a flowchart of a method for determining a candidate input in an embodiment. As shown in FIG. 4, the method for determining the candidate input is run on the first terminal 110 or the second terminal 130 as shown in FIG. 1, or the first terminal 210 as shown in FIG. 2. The method in this embodiment includes the following steps:

S402: Acquire preceding texts and/or following texts, less than or equal to a preset number, at a current input location in an input interface, and an input text of a current sentence corresponding to the current input location in the preceding text.

For example, the current input location is the location of a cursor. A context at the location of the cursor includes the following several situations: the situation that the location of the cursor has preceding and following texts, e.g., in a text editing environment. At this time, a preset number of preceding texts and following texts at the current input location are acquired. In the situation that the location of the cursor has only preceding texts, e.g., in a chat environment, a preset number of preceding texts at the current input location are acquired. In the situation that the location of the cursor has only following texts, e.g., in a text editing environment, a preset number of following texts at the current input location are acquired. The preset number of the preceding texts may be the same as or different from the preset number of the following texts, which may be set by a user or a developer according to specific situations.

In different application environments, the input text of the current sentence corresponding to the current input location in the preceding text is determined by using different methods. In a non-chat environment such as a text editing environment, it may be determined according to punctuations in the preceding texts at the location of the cursor. For another example, in a text editing environment, when a Chinese input method is used, each sentence is distinguished with ".", "?", or "!", or the like. In a preceding text, a corresponding punctuation is searched forward from the last word, and the input text of the current sentence starts from the corresponding punctuation to the last word of the preceding text. In a chat environment, a text input in an input box is provided as the input text of the current sentence corresponding to the current input location in the preceding text.

Understandably, the situation that the input text of the current sentence is null may exist. For example, in a non-chat environment, the last word of a preceding text ends with ".", "?", or "!", or other punctuations. For another example, in a chat environment, no input text exists in an input box.

S404: Provide the input text as a candidate sentence.

In a specific example, a candidate sentence set may be established, an input text being provided as an element in the candidate sentence set, i.e., a candidate sentence in the present embodiment.

S406: Calculate, according to the candidate sentence, the preceding texts and/or the following texts, possible conjunctions of a preset number of corresponding candidate sentences having a maximum occurrence probability.

In a specific example, a language model may be pre-trained based on a neural network by using different session sets or documents. The candidate sentence in the candidate sentence set is input into the pre-trained language model, and the possible conjunctions of the candidate sentence and the occurrence probabilities of the possible conjunctions are calculated, and the possible conjunctions of a preset number of candidate sentences having the maximum occurrence probability are selected. A specific preset number may be preset by a system developer or a user.

S408: Judge whether an end condition of updating a candidate sentence is satisfied or not, and if so, execute step S410.

When the language model is trained, a start identifier and an end identifier are added into each of trained sentences. The start identifier and the end identifier in an implementation manner may be the same, and may be, for example, both <END> symbols. Understandably, when the preceding texts and/or the following texts and the input text of the current sentence corresponding to the current input location in the preceding text are input into the language model, the start identifier and the end identifier will be added to the sentence. When the possible conjunction is calculated by using the language model, if the possible conjunction has the end identifier, it is considered that the possible conjunction is an end of the current sentence.

S410: Connect each possible conjunction having an end identifier to a corresponding candidate sentence respectively, so as to obtain each candidate sentence having the end identifier.

If satisfying the end condition of updating a candidate sentence, connecting each possible conjunction having an end identifier to a corresponding candidate sentence, so as to obtain each candidate sentence having the end identifier. A result set may be established, the candidate sentence having the end identifier is put into the result set, and the candidate sentence having the end identifier is provided as an element of the result set. Understandably, the result set includes a candidate sentence updated at each time and the possible conjunction having the end identifier thereof.

S412: Calculate an occurrence probability of each candidate sentence having the end identifier respectively according to the preceding texts and/or the following texts, and provide a preset number of candidate sentences having the end identifier and having the maximum occurrence probability as candidate inputs.

For example, all candidate sentences having the end identifier in the result set are input into the pre-trained language model respectively, occurrence probabilities of the candidate sentences having the end identifier are calculated, and a preset number of candidate sentences having the end identifier and having the maximum occurrence probability are selected as the candidate inputs.

According to the above-mentioned method for determining the candidate input, an initial candidate sentence is the input text of the current sentence; according to the input text of the current sentence, a preceding text and/or a following text, the possible conjunctions of the input text of the current sentence are calculated; when satisfying the end condition of updating a candidate sentence, each possible conjunction having the end identifier is connected to a corresponding candidate sentence respectively, so as to obtain each candidate sentence having the end identifier; the occurrence probability of the candidate sentence having the end identifier is calculated according to the preceding text and/or the following text; and a preset number of candidate sentences having the end identifier and having the maximum occurrence probability are provided as the candidate inputs. Because the possible conjunctions are determined according to the preceding text and/or the following text, the calculated possible conjunctions can provide candidate inputs that conform to the context in consideration of preceding text and/or following text input conditions. By determining candidate inputs of a long sentence conforming to the context, a user does not need to obtain a long sentence by multiple times of inputting, so that the input efficiency can be improved.

In another embodiment, referring to FIG. 4, if the judgment result of step S408 is NOT, step S409 is executed.

S409: Connect each possible conjunction without an end identifier to a corresponding candidate sentence respectively, and then update the candidate sentence.

When the end condition of updating a candidate sentence is not satisfied, connecting each possible conjunction without the end identifier to a corresponding candidate sentence respectively, and updating the candidate sentence. The updated candidate sentence consists of (or includes) a non-updated candidate sentence and a possible conjunction without an end identifier. In the present embodiment, all possible conjunctions without the end identifier of each candidate sentence in the candidate sentence set are connected to the corresponding candidate sentence to obtain an updated candidate sentence, all the updated candidate sentences constituting an updated candidate sentence set.

After step S409, step S406 is re-executed to calculate the possible conjunctions of the updated candidate sentences in the updated candidate sentence set, so as to obtain the possible conjunctions of a preset number of updated candidate sentences having the maximum occurrence probability.

According to the above-mentioned method for determining the candidate input, the candidate inputs are calculated according to the possible conjunctions of the candidate sentences, and the candidate sentences are updated according to the candidate sentences and the possible conjunctions without an end identifier, so the possible conjunctions of the candidate sentences are cyclically calculated. By repeatedly and cyclically calculating the possible conjunctions, the number of words can be continuously increased to form the candidate inputs of a long sentence.

Figure 5:
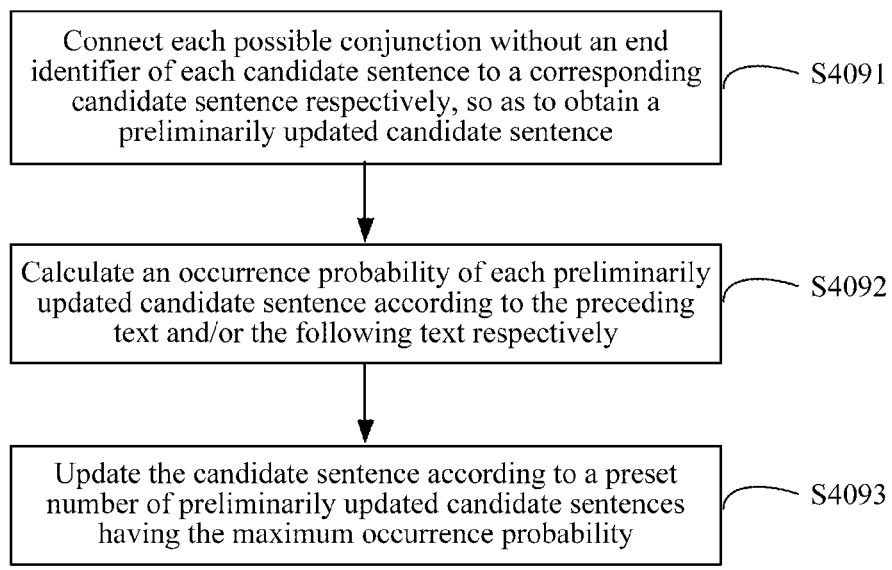
FIG. 5 is a flowchart of a step of updating a candidate sentence in an embodiment.

Step S409 is a step of connecting each possible conjunction without an end identifier to a corresponding candidate sentence respectively and then updating the candidate sentence. In another embodiment, as shown in FIG. 5, the step of updating the candidate sentence includes:

(1): Connect each possible conjunction without an end identifier of each candidate sentence to a corresponding candidate sentence respectively, so as to obtain a preliminarily updated candidate sentence.

(2): Calculate an occurrence probability of each preliminarily updated candidate sentence according to the preceding text and/or the following text respectively.

(3) Update the candidate sentence according to a preset number of preliminarily updated candidate sentences having the maximum occurrence probability.

Understandably, in the presence of multiple possible conjunctions, a plurality of updated candidate sentences may be correspondingly obtained. Because the possible conjunctions of the candidate sentences are cyclically executed when an end condition of updating a candidate sentence is not satisfied, in candidate sentences updated once, for each updated candidate sentence, a plurality of possible conjunctions without an end identifier may be obtained, so as to obtain a plurality of updated candidate sentences. When there are more updated candidate sentences, the calculated amount is increased, thereby resulting in slow calculation of candidate inputs. In order to increase a calculation speed, in the present embodiment, the occurrence probability of each preliminarily updated candidate sentence is calculated according to the preceding text and/or the following text respectively, and a preset number of preliminarily updated candidate sentences having the maximum occurrence probability are selected therefrom to serve as updated candidate sentences. It can be ensured that the number of the updated candidate sentences is within a certain number, thereby increasing the calculation speed of the possible conjunctions of the candidate sentences, and further increasing the calculation speed of the candidate inputs.

In another embodiment, the end condition of updating a candidate sentence may include: all possible conjunctions of each candidate sentence have an end identifier. In this embodiment, if all possible conjunctions of each candidate sentence have an end identifier (at this time, elements of a candidate sentence set are null), the end condition of updating a candidate sentence is satisfied, each possible conjunction having an end identifier is connected to a corresponding candidate sentence respectively, so as to obtain each candidate sentence having the end identifier.

In another embodiment, after step S409, the method may further include: calculating an accumulative update count of a candidate sentence.

For example, calculation of an accumulative update count of a candidate sentence may be implemented by calculating an iterative update count. For example, after the step of providing the input text as a candidate sentence, set N=0, where N represents the accumulative update count of the candidate sentence (i.e., iterative update count). After the step of connecting each possible conjunction without an end identifier to the candidate sentence respectively and then updating the candidate sentence, set N=N+1, so as to implement accumulation of updated candidate sentences.

In this embodiment, the end condition of updating a candidate sentence may include: an update count of a candidate sentence reaches a set maximum value, so that when the update count of a candidate sentence reaches the set maximum value, i.e., the above-mentioned N is equal to the set maximum value, the end condition of updating a candidate sentence is satisfied, and executing the step of connecting each possible conjunction having an end identifier to a corresponding candidate sentence respectively, so as to obtain each candidate sentence having the end identifier.

In the present embodiment, by setting a maximum value for a sentence update count, low calculation speed of candidate inputs caused by multiple cycles can be avoided; and by defining a cyclic calculation count within a certain cycle, the calculation speed of the candidate inputs can be increased.

In yet another embodiment, step S402 may include: acquiring preceding texts and/or following texts, less than or equal to a preset number, at a current input location in an input interface, and an input text and language style parameters of a current sentence corresponding to the current input location in the preceding text.

A language style refers to a language expression pattern of an input text. The language style is related to word usage habits, professional fields and talking tones. The language style parameters may be used for presetting an input method application on a terminal device. The language style parameters of an implementation manner include: user habits being network catchwords, and talking tones being playfulness.

In this embodiment, step S406 may specifically include: calculating, according to the candidate sentence, the preceding texts and/or the following texts, possible conjunctions of a preset number of candidate sentences corresponding to the language style parameters and having a maximum occurrence probability. Thus, the obtained candidate inputs are candidate inputs corresponding to the language style.

For example, different language style models are trained by using different language style sets, preceding texts and/or following texts, less than or equal to a preset number, at an input location and an input text of a current sentence corresponding to a current input location in the preceding text are input into a language model corresponding to the language style, and the possible conjunctions corresponding to the language style parameters are calculated.

In the present embodiment, by setting the language style parameters, it is possible to determine the candidate inputs that are the same as the language style parameters, and to make the candidate inputs more in line with language habits of a user, thereby implementing personalized setting of the language style of the user.

In an embodiment, the language model is pre-trained based on a neural network by using a plurality of sets of conversations and a plurality of documents. When the language model is trained by using conversations, a set of conversations are $d_i=\{a_1^i, a_2^i, \ldots, a|_{d_i}|^i\}$, where $a_j^i$ is a $j^{th}$ sentence in an $i^{th}$ conversation. When the language model is trained by using documents, a document set consists of a plurality of documents $\{d_1, d_2, \ldots, d_n\}$. Each document consists of (or includes) a plurality of sentences, denoted as $d_i=\{a_1^i, a_2^i, \ldots, a_{|d_i|}^i\}$, where $a_j^i$ is a $j^{th}$ sentence in an $i^{th}$ document.

When the language model is trained by using conversations, by aiming to maximize likelihood $\Pi_{i=1}^n \Pi_j^{|d_i|} p(a_j^i | a_{<j}^i)$ on a given data set, a cycle neural network model is trained. Before training, a start identifier <END> is separately added to the beginning and end of a sentence said by each person, on behalf of that a person begins to say a sentence and a person finishes a sentence, where $p(a_j^i | a_{<j}^i)$ represents, when first j sentences $a_{<j}^i$ (not including j) in an $i^{th}$ conversation group is given, an occurrence probability of $j^{th}$ sentence $a_j^i$. $p(a_j^i|a_{<j}^i)$ may be further written as $p(a_j^i|a_{<j}^i)=\Pi_{k=1}^{|a_j^i|}p(a_{jk}^i|a_{<j}^i,a_{j,<k}^i)$, where $p(a_{jk}^i|a_{<j}^i,a_{j,<k}^i)$ represents, when first j sentences $a_{<j}^i$ in an $i^{th}$ conversation group and first k words (not including k) in a $j^{th}$ sentence are given, an occurrence probability of a $k^{th}$ word in a sentence $a_j^i$.

When the language model is trained by using conversations, by aiming to maximize likelihood $\Pi_{i=1}^n\Pi_j^{|d_i|}p(a_j^i|a_{<j}^i)$ on a given data set, where $p(a_j^i|a_{<j}^i)$ represents, when first j sentences $a_{<j}^i$ (not including j) in an $i^{th}$ document is given, an occurrence probability of a $j^{th}$ sentence $a_j^i$, $p(a_j^i|a_{<j}^i)$ may be further written as $p(a_j^i|a_{<j}^i)=\Pi_{k=1}^{|a_j^i|}p(a_{jk}^i|a_{<j}^i,a_{j,<k}^i)$, where $p(a_{jk}^i|a_{<j}^i,a_{j,<k}^i)$, represents, when first j sentences $a_{<j}^i$ in an $i^{th}$ conversation group and first k words (not including k) in a $j^{th}$ sentence are given, an occurrence probability of different possible words at a $k^{th}$ location in a sentence $a_j^i$.

In an implementation manner, the method for determining the candidate input in a chat environment by using a language model specifically includes: assuming that a user gives j−1 sentences $\{a_1, a_2, \ldots, a_{j-1}\}$ in front of a current conversation, and z words $\{a_{j1}, a_{j2}, \ldots, a_{jz}\}$ at the beginning of a current input sentence $a_j$, and calculating, by using a language model, u $a_j$ making $\Pi_{k=1}^{|a_j|}p(a_{jk}|a_{<j},a_{j,<k})$ maximal. In an implementation manner, the method for determining the candidate input in a non-chat environment by using a language model specifically includes: assuming that a user gives j−1 sentences $\{a_1, a_2, \ldots, a_{j-1}\}$ in front of a current document editing location, l sentences $\{a_{j+1}, a_{j+2}, \ldots, a_{j+l}\}$ behind the current document editing location, and z words $\{a_{j1}, a_{j2}, \ldots, a_{jz}\}$ at the beginning of a current input sentence $a_j$, and calculating, by using a language model, u $a_j$ making $\Pi_{k=1}^{|a_j|}p(a_{jk}|a_{<j},a_{j,<}^k)$ maximal, where u is a positive integer, i.e., the number of possible conjunctions of candidate sentences having a maximum occurrence probability and the candidate inputs having a maximum probability.

Specifically, j−1 sentences in front of a current conversation and z words at the beginning of a current input sentence $a_j$ are input into a language model, or j−1 sentences in front of a current document editing location, l sentences behind the current document editing location and z words at the beginning of a current input sentence $a_j$ are input into a language model, and u possible conjunctions of z words at the beginning of the current input sentence $a_j$ having a maximum probability are calculated. When the end condition of updating a candidate sentence is not satisfied, each possible conjunction without an end identifier is connected to a corresponding candidate sentence respectively, and then the candidate sentences are updated. The updated candidate sentences are input into a language model respectively, and possible conjunctions of the updated candidate sentences are calculated until an update count of a candidate sentence reaches a set maximum value or all possible conjunctions of each updated candidate sentence have an end identifier. Each possible conjunction having an end identifier is connected to a corresponding candidate sentence respectively, so as to obtain a candidate sentence having the end identifier, the candidate sentence having the end identifier is input to a language model, and u candidate sentences having the end identifier and having a maximum probability are calculated as the candidate inputs.

Figure 6:
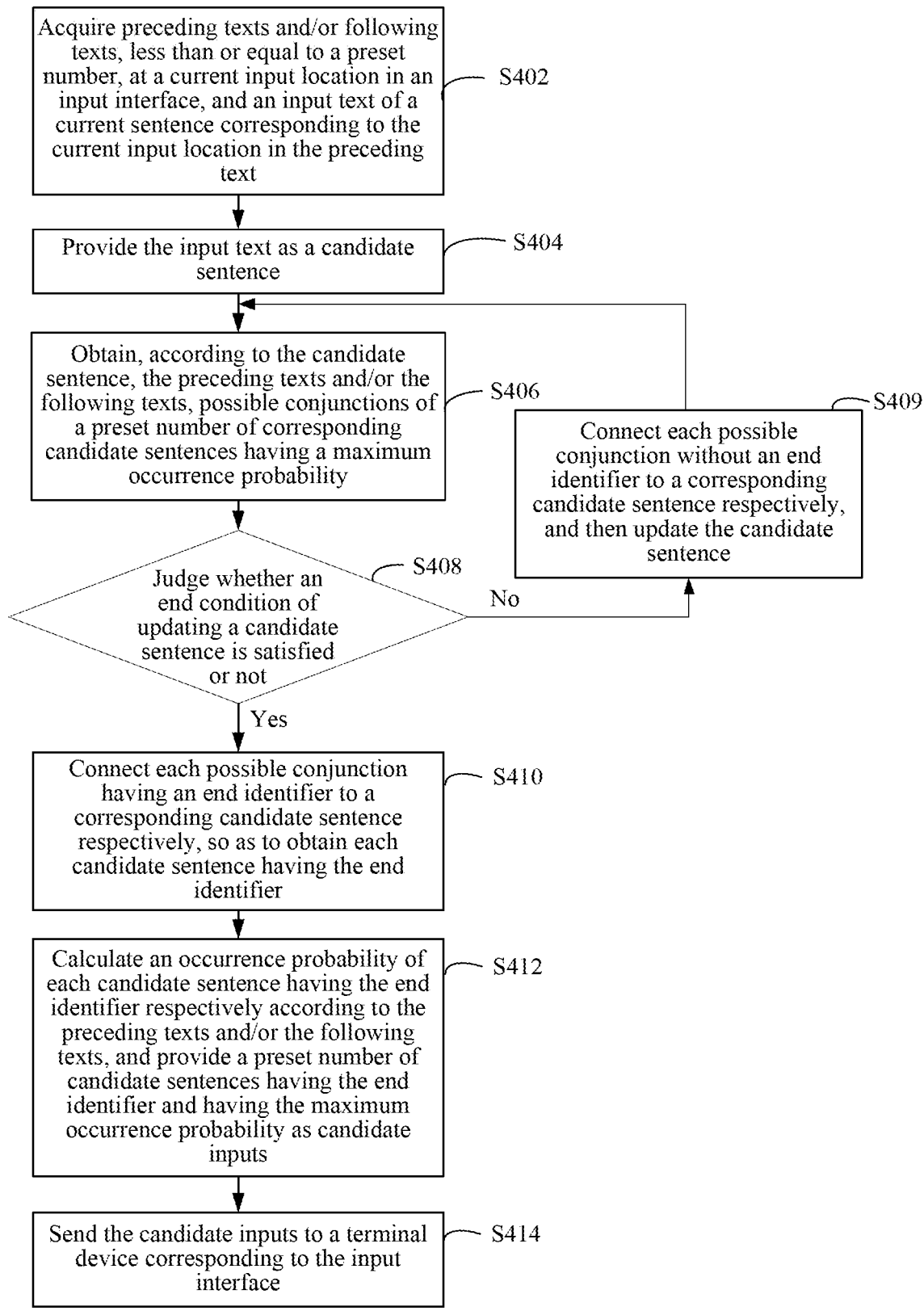
FIG. 6 is a flowchart of a method for determining a candidate input in another embodiment.

In an embodiment, the above-mentioned method for determining the candidate input may also be run on the server 120 as shown in FIG. 1 or the server 220 as shown in FIG. 2. In this case, as shown in FIG. 6, after step S412, the method may further include:

S414: Send the candidate inputs to a terminal device corresponding to the input interface.

The method for determining the candidate input in the present embodiment is run on the server. Understandably, the server receives preceding texts and/or following texts, which are sent by the terminal and less than or equal to a preset number, at a current input location in an input interface, and an input text of a current sentence corresponding to the current input location in the preceding text, and calculates and determines candidate inputs according to these acquired data. The determined candidate inputs are sent to a corresponding terminal device.

In the present embodiment, a terminal device sends preceding texts and/or following texts, less than or equal to a preset number, at a current input location in an input interface, and an input text of a current sentence corresponding to the current input location in the preceding text to a server, and the server determines candidate inputs. The situation of low calculative ability of a local device can be solved, the candidate inputs are quickly calculated by using the calculative ability of the server, and the calculated candidate inputs are sent to the terminal device.

Figure 7:
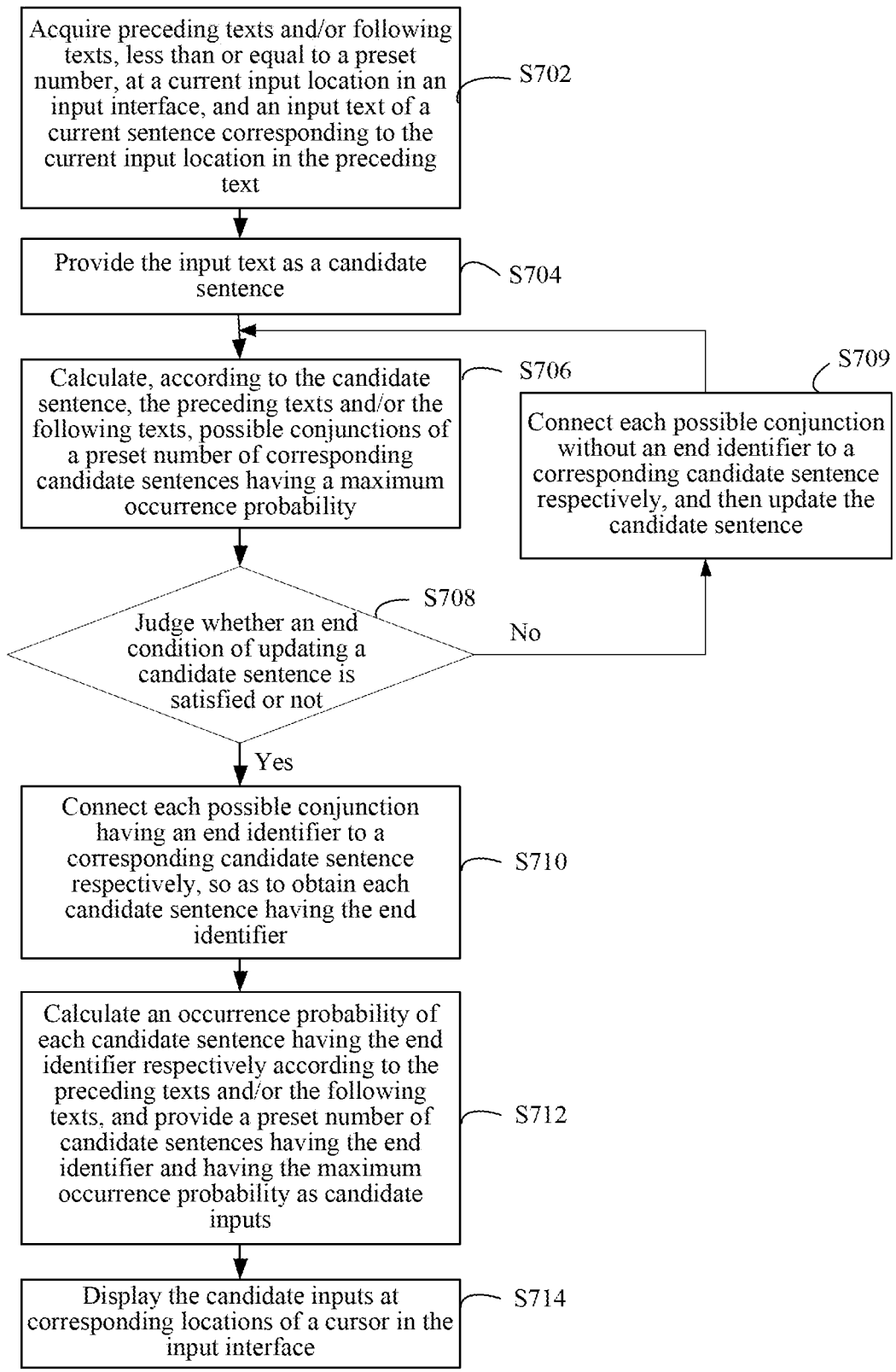
FIG. 7 is a flowchart of an input prompting method in an embodiment.

In another embodiment, the embodiment of the present disclosure also provides an input prompting method. The input prompting method is run on the first terminal 110 or the second terminal 130 as shown in FIG. 1. As shown in FIG. 7, the method may specifically include the following steps:

S702: Acquire preceding texts and/or following texts, less than or equal to a preset number, at a current input location in an input interface, and an input text of a current sentence corresponding to the current input location in the preceding text.

S704: Provide the input text as a candidate sentence.

S706: Calculate, according to the candidate sentence, the preceding texts and/or the following texts, possible conjunctions of a preset number of corresponding candidate sentences having a maximum occurrence probability.

S708: Judge whether an end condition of updating a candidate sentence is satisfied or not, and if so, execute step S710.

S710: Connect each possible conjunction having an end identifier to a corresponding candidate sentence respectively, so as to obtain each candidate sentence having the end identifier.

S712: Calculate an occurrence probability of each candidate sentence having the end identifier respectively according to the preceding texts and/or the following texts, and provide a preset number of candidate sentences having the end identifier and having the maximum occurrence probability as the candidate inputs.

Exemplary implementation methods of the above-mentioned steps may be the same as the implementation manners of the response steps in the above-mentioned method for determining the candidate input, and details are not described herein again.

In another embodiment, referring to FIG. 7, if the judgment result of step S708 is NOT, execute step S709: connect each possible conjunction without an end identifier to a corresponding candidate sentence respectively, and then update the candidate sentence.

After step S709, step S706 is re-executed to calculate the possible conjunctions of the updated candidate sentences in an updated candidate sentence set, so as to obtain the possible conjunctions of a preset number of updated candidate sentences having the maximum occurrence probability.

After step S712, execute the following step:

S714: Display the candidate inputs at corresponding locations of a cursor in the input interface.

Figure 8:
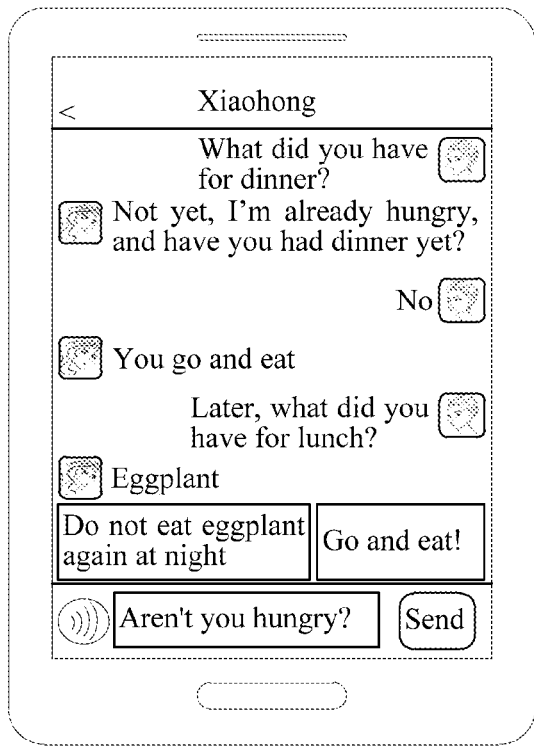
FIG. 8 is an interface diagram of displaying a candidate input on an input interface in an embodiment.

FIG. 8 shows an interface diagram of displaying a candidate input on a terminal device in a specific example. In the present embodiment, by displaying the candidate inputs at corresponding locations of a cursor in an input interface, a user can check the candidate inputs visually and select a candidate input, thereby bringing convenience to an input operation of the user, and improving the input efficiency of the user.

In another embodiment, after step S714, the method further includes the following steps:

Acquire, if the input interface is in a chat environment, a candidate input having a maximum occurrence probability when the state of a corresponding chat account is in a set state and an automatic reply is set, input the candidate input having the maximum occurrence probability into an input box, and send the candidate input.

Figure 9:
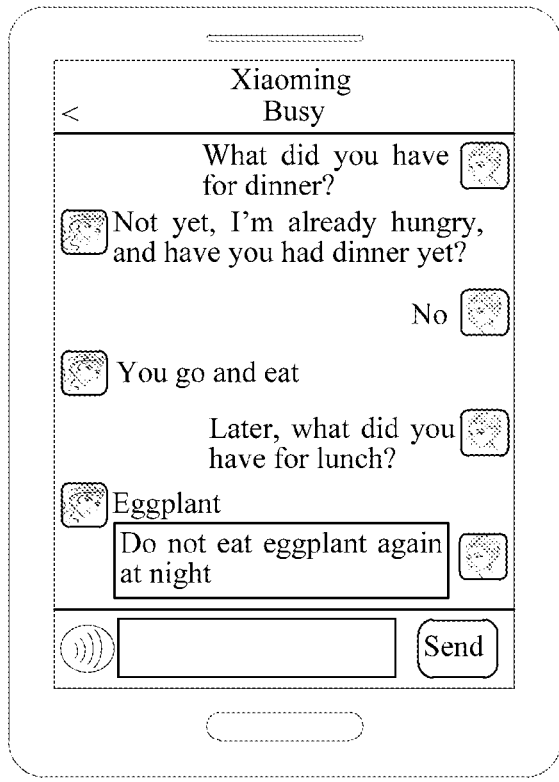
FIG. 9 is an interface diagram of an automatic reply according to a candidate input in an embodiment.

The set state may include a state of LEAVE, BUSY or DO NOT DISTURB. In a chat tool such as instant messaging, a user may set whether an automatic reply is required in the state of LEAVE, BUSY or DO NOT DISTURB. When it is set that an automatic reply is required in the above-mentioned state, an automatic reply is sent to a chat friend after a message sent by the chat friend is received. The automatic reply message is usually a reply message that has been set when the user sets an automatic reply. For example, the message is "I have gone to eat, and I will contact you later". With the method of the present embodiment, when it is detected that a chat account is in the above-mentioned state and an automatic reply is set, a chat record with the other party is acquired, candidate inputs are calculated according to the chat record, and the candidate input having a maximum probability is input into an input box to be sent, so as to achieve an automatic chat with the other party. Moreover, the candidate inputs are determined according to the chat record from the perspective of the user, and are in line with the current chat context. FIG. 9 shows an interface diagram of an automatic reply in an implementation manner.

Figure 10:
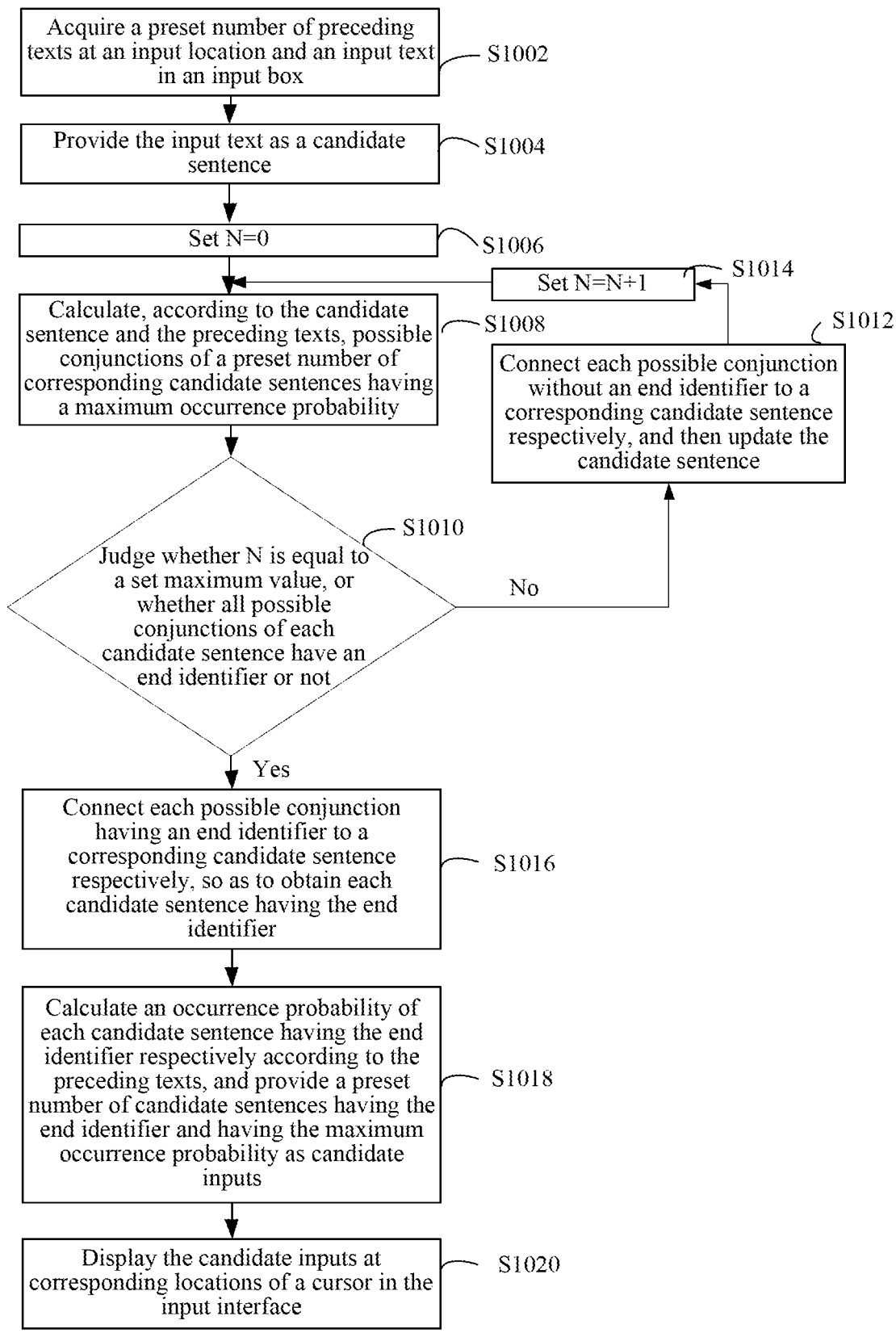
FIG. 10 is a flowchart of an input prompting method in yet another embodiment.

In the present embodiment, in a chat environment, as shown in FIG. 10, an exemplary implementation process of the input prompting method includes the following steps:

S1002: Acquire a preset number of preceding texts at an input location and an input text in an input box.

S1004: Provide the input text as a candidate sentence.

S1006: Set N=0.

N in the present embodiment is an accumulative update count of a candidate sentence.

S1008: Calculate, according to the candidate sentence and the preceding texts, possible conjunctions of a preset number of corresponding candidate sentences having a maximum occurrence probability.

S1010: Judge whether N is equal to a set maximum value, or whether all possible conjunctions of each candidate sentence have an end identifier or not, if not, execute step S1012, and if one of the judgment results is YES, execute step S1016.

S1012: Connect each possible conjunction without an end identifier to a corresponding candidate sentence respectively, and then update the candidate sentence.

S1014: Set N=N+1.

Accumulation of updated candidate sentences is implemented by assigning N.

After step S1014, step S1008 is re-executed to calculate the possible conjunctions of the updated candidate sentences in the updated candidate sentence set, so as to obtain the possible conjunctions of a preset number of updated candidate sentences having the maximum occurrence probability.

S1016: Connect each possible conjunction having an end identifier to a corresponding candidate sentence respectively, so as to obtain each candidate sentence having the end identifier.

S1018: Calculate an occurrence probability of each candidate sentence having the end identifier respectively according to the preceding texts, and provide a preset number of candidate sentences having the end identifier and having the maximum occurrence probability as the candidate inputs.

S1020: Display the candidate inputs at corresponding locations of a cursor in the input interface.

In this embodiment, a user can check the candidate inputs visually and select a candidate input, thereby bringing convenience to an input operation of the user, and improving the input efficiency of the user.

Figure 11:
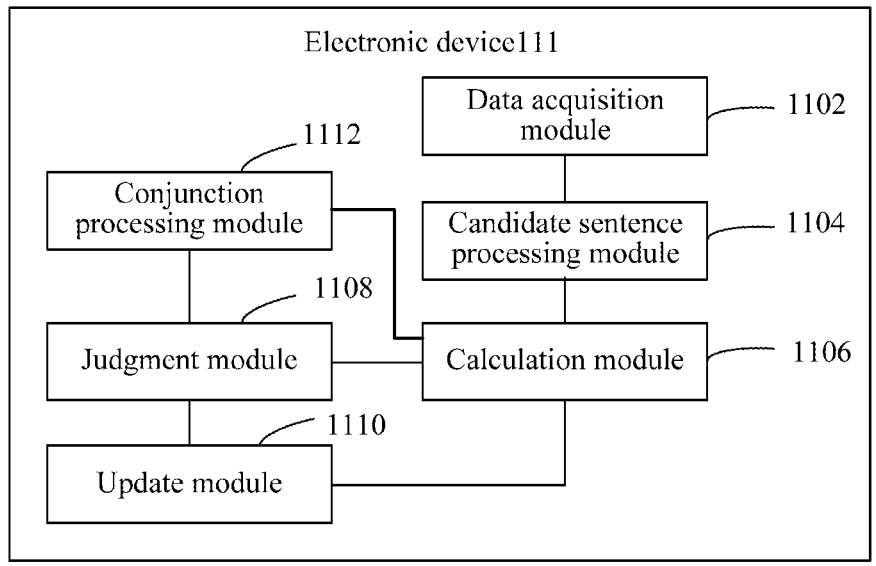
FIG. 11 is a structure block diagram of an electronic device in an embodiment.

FIG. 11 is a structure block diagram of an electronic device 111 in an embodiment. The internal structure of the electronic device 111 may correspond to the structure as shown in FIG. 3, and the following modules may be implemented totally or partially by software, hardware or combinations thereof. As shown in FIG. 11, the electronic device 111 includes: a data acquisition module 1102, a candidate sentence processing module 1104, a calculation module 1106, a judgment module 1108, and a conjunction processing module 1112.

The data acquisition module 1102 is configured to acquire preceding texts and/or following texts, less than or equal to a preset number, at a current input location in an input interface, and an input text of a current sentence corresponding to the current input location in the preceding text.

The candidate sentence processing module 1104 is configured to provide the input text as a candidate sentence.

The calculation module 1106 is configured to calculate, according to the candidate sentence, the preceding texts and/or the following texts, possible conjunctions of a preset number of corresponding candidate sentences having a maximum occurrence probability, calculate an occurrence probability, determined by the conjunction processing module, of each candidate sentence having an end identifier respectively, and provide a preset number of candidate sentences having the end identifier and having the maximum occurrence probability as the candidate inputs.

The judgment module 1108 is configured to judge whether an end condition of updating a candidate sentence is satisfied or not.

The conjunction processing module 1112 is configured to connect, when the judgment result of the judgment module is YES, each possible conjunction having an end identifier to a corresponding candidate sentence respectively, so as to obtain each candidate sentence having the end identifier.

According to the above-mentioned electronic device, an initial candidate sentence is an input text of a current sentence; according to the input text of the current sentence, a preceding text and/or a following text, the possible conjunctions of the input text of the current sentence are calculated; and when an end condition of updating a candidate sentence is not satisfied, a possible conjunction without an end identifier is connected to the candidate sentence, the candidate sentence is then updated, and the possible conjunctions of the updated candidate sentence are cyclically calculated. Because the possible conjunctions are determined according to the preceding text and/or the following text, the calculated possible conjunctions can provide candidate inputs that conform to the context in consideration of preceding text and/or following text input conditions. By determining the candidate inputs of a long sentence conforming to the context, a user does not need to obtain a long sentence by multiple times of inputting, so that the input efficiency can be improved.

In another embodiment, referring to FIG. 11, the electronic device further includes an update module 1110, configured to connect, when the judgment result of the judgment module is NOT, each possible conjunction without an end identifier to a corresponding candidate sentence respectively, and then update the candidate sentence.

According to the above-mentioned electronic device, the candidate inputs are calculated according to the possible conjunctions of the candidate sentences, and the candidate sentences are updated according to the candidate sentences and the possible conjunctions without an end identifier, so the possible conjunctions of the candidate sentences are cyclically calculated. By repeatedly and cyclically calculating the possible conjunctions, the number of words can be continuously increased to form the candidate inputs of a long sentence.

Figure 12:
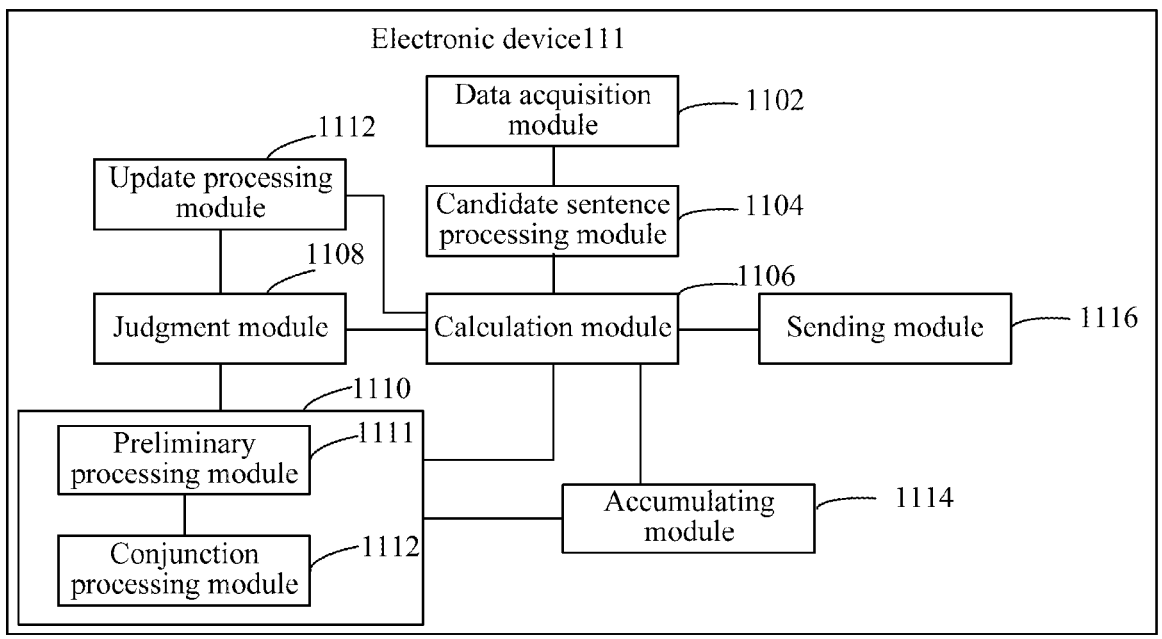
FIG. 12 is a structure block diagram of an electronic device in another embodiment.

In another embodiment, as shown in FIG. 12, the update module 1110 includes: a preliminary processing module 1111 and an update processing module 1112.

The preliminary processing module 1111 is configured to connect each possible conjunction without an end identifier of each candidate sentence to a corresponding candidate sentence respectively, so as to obtain a preliminarily updated candidate sentence.

The calculation module 1106 is configured to calculate an occurrence probability of each preliminarily updated candidate sentence according to the preceding text and/or the following text respectively.

The update processing module 1112 is configured to update the candidate sentence according to a preset number of preliminarily updated candidate sentences having the maximum occurrence probability.

In the present embodiment, an occurrence probability of each preliminarily updated candidate sentence is calculated according to the preceding text and/or the following text respectively, and a preset number of preliminarily updated candidate sentences having the maximum occurrence probability are selected therefrom to serve as updated candidate sentences. It can be ensured that the number of the updated candidate sentences is within a certain number, thereby increasing the calculation speed of the possible conjunctions of the candidate sentences, and further increasing the calculation speed of the candidate inputs.

In another embodiment, the end condition of updating a candidate sentence may include: all possible conjunctions of each candidate sentence have an end identifier.

In an embodiment, the apparatus may further include: an accumulating module 1114, configured to calculate an accumulative update count of a candidate sentence.

The end condition of updating a candidate sentence includes: an accumulative update count of a candidate sentence, calculated by the accumulating module, reaches a set maximum value.

In the present embodiment, by setting a maximum value for a sentence update count, low calculation speed of candidate inputs caused by multiple cycles can be avoided; and by defining a cyclic calculation count within a certain cycle, the calculation speed of the candidate inputs can be increased.

In yet another embodiment, the data acquisition module 1102 is configured to acquire language style parameters.

The calculation module 1106 calculates, according to the candidate sentence, the preceding texts and/or the following texts, possible conjunctions of a preset number of corresponding candidate sentences corresponding to the language style parameters and having a maximum occurrence probability.

In the present embodiment, by setting the language style parameters, it is possible to determine the candidate inputs that are the same as the language style parameters, and to make the candidate inputs more in line with language habits of a user, thereby implementing personalized setting of the language style of the user.

In another embodiment, an apparatus for determining a candidate input further includes a sending module 1116, configured to send the candidate inputs to a terminal device corresponding to the input interface.

The method for determining the candidate input in the present embodiment is run on a server. Understandably, the server receives preceding texts and/or following texts, which are sent by the terminal and less than or equal to a preset number, at a current input location in an input interface, and an input text of a current sentence corresponding to the current input location in the preceding text, and calculates and determines candidate inputs according to these acquired data. The determined candidate inputs are sent to a corresponding terminal device.

In the present embodiment, preceding texts and/or following texts, less than or equal to a preset number, at a current input location in an input interface, and an input text of a current sentence corresponding to the current input location in the preceding text are sent to a server, and the server determines candidate inputs. The situation of low calculative ability of a local device can be solved, the candidate inputs are quickly calculated by using the calculative ability of the server, and the calculated candidate inputs are sent to the terminal device.

Figure 13:
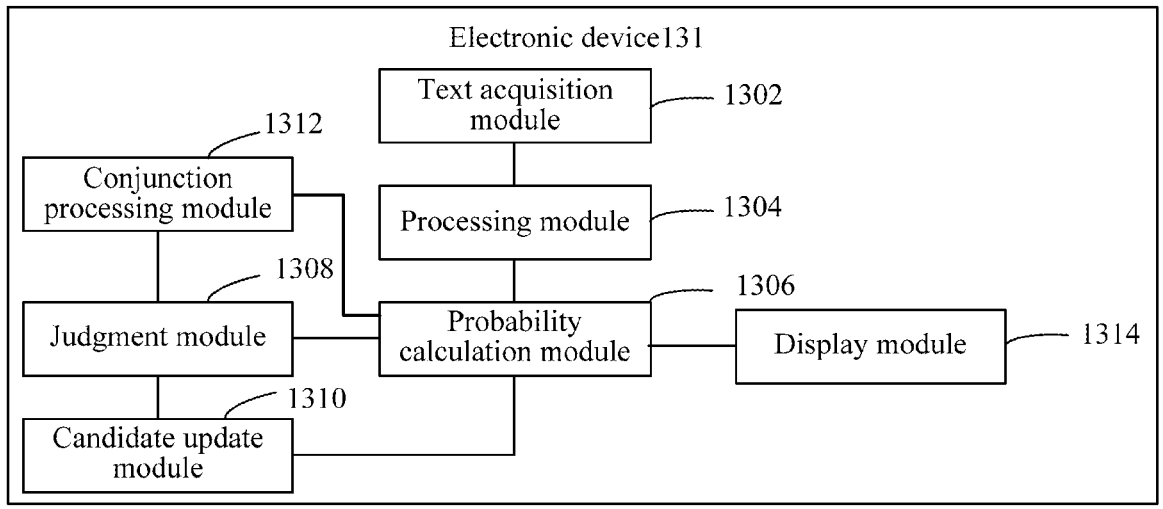
FIG. 13 is a structure block diagram of an electronic device in yet another embodiment.
Figure 14:
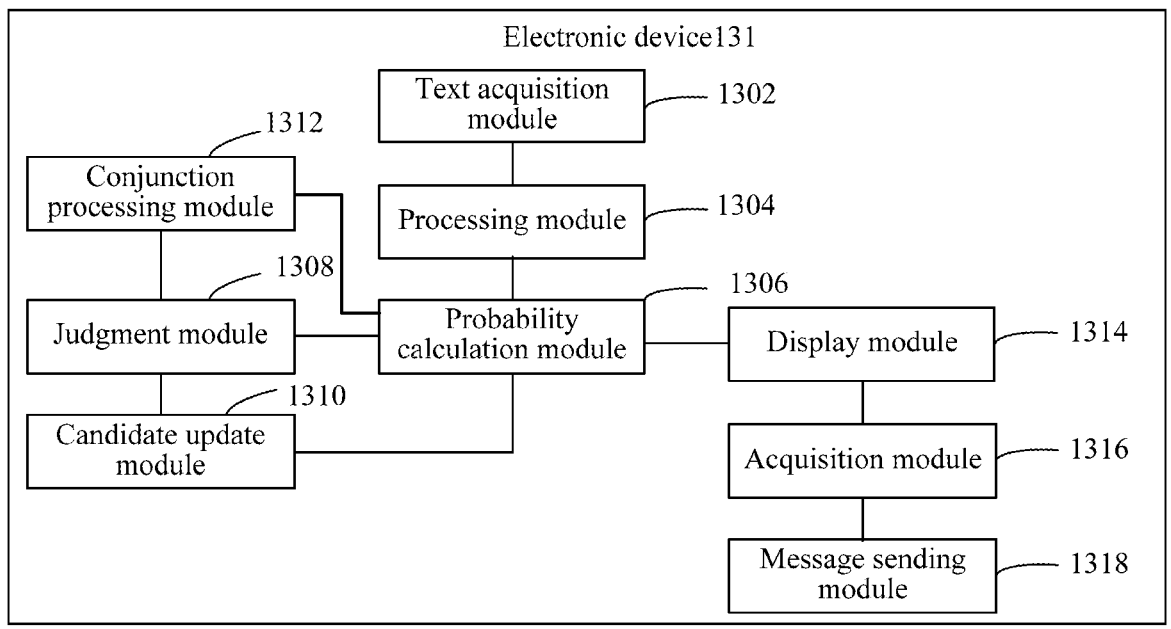
FIG. 14 is a structure block diagram of an electronic device in another embodiment.

FIG. 13 is a structure block diagram of an electronic device 131 in an embodiment. As shown in FIG. 13, the electronic device 131 includes: a text acquisition module 1302, a processing module 1304, a probability calculation module 1306, a judgment module 1308, a conjunction processing module 1312, and a display module 1314.

The text acquisition module 1302 is configured to acquire preceding texts and/or following texts, less than or equal to a preset number, at a current input location in an input interface, and an input text of a current sentence corresponding to the current input location in the preceding text.

The processing module 1304 is configured to provide the input text as a candidate sentence.

The probability calculation module 1306 is configured to calculate, according to the candidate sentence, the preceding texts and/or the following texts, possible conjunctions of a preset number of corresponding candidate sentences having a maximum occurrence probability, calculate an occurrence probability, determined by the conjunction processing module, of each candidate sentence having an end identifier respectively, and provide a preset number of candidate sentences having the end identifier and having the maximum occurrence probability as candidate inputs.

The judgment module 1308 is configured to judge whether an end condition of updating a candidate sentence is satisfied or not.

The conjunction processing module 1312 is configured to connect, when the judgment result of the judgment module is YES, each possible conjunction having an end identifier to a corresponding candidate sentence respectively, so as to obtain each candidate sentence having the end identifier.

The display module 1314 is configured to display the candidate inputs at corresponding locations of a cursor in the input interface.

In another embodiment, please refer to FIG. 13. The electronic device further includes: a candidate update module 1310, configured to connect, when the judgment result of the judgment module is NOT, each possible conjunction without an end identifier to a corresponding candidate sentence respectively, and then update the candidate sentence.

FIG. 8 shows an interface diagram of displaying a candidate input on a terminal device in an implementation manner. In the present embodiment, by displaying the candidate inputs at corresponding locations of a cursor in an input interface, a user can check the candidate inputs visually and select a candidate input, thereby bringing convenience to an input operation of the user, and improving the input efficiency of the user.

In yet another embodiment, an input prompting apparatus further includes:

an acquisition module 1316, configured to acquire, if the input interface is in a chat environment, a candidate input having a maximum occurrence probability when the state of a corresponding chat account is in a set state and an automatic reply is set; and a message sending module 1318, configured to input the candidate input having the maximum occurrence probability into an input box, and send the candidate input.

With the electronic device of the present embodiment, when it is detected that a chat account is in the above-mentioned state and an automatic reply is set, a chat record with the other party is acquired, candidate inputs are calculated according to the chat record, and the candidate input having a maximum probability is input into an input box to be sent, so as to achieve an automatic chat with the other party. Moreover, the candidate inputs are determined according to the chat record from the perspective of the user, and are in line with the current chat context. FIG. 9 shows an interface diagram of an automatic reply in an implementation manner.

A person of ordinary skill in the art may understand that all or part of flows in the foregoing embodiment method may be completed by instructing relevant hardware via a computer program, wherein the program may be stored in a non-volatile computer-readable storage medium. For example, in the embodiments of the present disclosure, the program may be stored in a storage medium of a computer system and executed by at least one processor in the computer system, so as to implement the flow of the embodiments including each of the foregoing method. The storage medium may be a non-transitory computer-readable medium such as a magnetic disk, an optical disk, a read-only memory (ROM) or a random access memory (RAM).

All technical features of the above-mentioned embodiments may be combined randomly. For a brief description, not all possible combinations of the technical features in the above-mentioned embodiments are described. However, as long as the combinations of these technical features do not contradict each other, they should be regarded as a scope recorded in the present specification.

The above-mentioned embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method, comprising:

acquiring, by processing circuitry of an electronic device, text that precedes and/or follows a current text input location in an input interface, the text containing less than or equal to a preset number of words;

acquiring, by the processing circuitry, a candidate sentence based on the text which is contained in a current sentence that corresponds to the current text input location;

determining, by the processing circuitry, a first preset number of possible phrases for the candidate sentence based on occurrence probabilities of the first preset number of possible phrases that are determined for the candidate sentence;

connecting, by the processing circuitry, the first preset number of possible phrases to the candidate sentence to obtain updated candidates sentences, the updated candidate sentences including a first updated candidate sentence having an end identifier and a second updated candidate sentence not having the end identifier;

determining, by the processing circuitry, a second preset number of possible phrases for the second updated candidate sentence that is determined not to have the end identifier, the second preset number of possible phrases being determined based on occurrence probabilities of the second preset number of possible phrases that are determined for the second updated candidate sentence;

connecting, by the processing circuitry, the second preset number of possible phrases having the end identifiers to the second updated candidate sentence that is determined not to have the end identifier to obtain one or more additional updated candidate sentences having the end identifiers;

calculating, by the processing circuitry, occurrence probabilities of predicted candidate sentences having the end identifiers according to the text that precedes and/or follows the current text input location, the predicted candidate sentences including the first updated candidate sentence having the end identifier and the one or more additional updated candidate sentences having the end identifiers; and providing, by the processing circuitry, a preset number of the predicted candidate sentences having the end identifiers based on the calculated occurrence probabilities of the predicted candidate sentences as candidate inputs.

2. The method according to claim 1, wherein the connecting the first preset number of possible phrases to the candidate sentence includes connecting, by the processing circuitry, the first preset number of possible phrases to the candidate sentence to obtain preliminary updated candidate sentences;

calculating, by the processing circuitry, occurrence probabilities of the preliminary updated candidate sentences according to the text that precedes and/or follows the current text input location; and the updated candidate sentences include a preset number of the preliminary updated candidate sentences that are selected based on the occurrence probabilities of the preliminary updated candidate sentences.

3. The method according to claim 1, wherein the connecting the second preset number of possible phrases comprises:
connecting the second preset number of possible phrases having the end identifiers to the second updated candidate sentence that is determined not to have the end identifier when all the second preset number of possible phrases have the end identifiers.

4. The method according to claim 1, further comprising:
calculating, by the processing circuitry, an accumulative update count of the candidate sentence after the first preset number of possible phrases are connected to the candidate sentence, wherein
the connecting the second preset number of possible phrases includes connecting the second preset number of possible phrases having the end identifiers to the second updated candidate sentence that is determined not to have the end identifier when the accumulative update count of the candidate sentence reaches a set maximum value.

5. The method according to claim 1, further comprising:
acquiring, by the processing circuitry, language style parameters of the current sentence corresponding to the current text input location, wherein
the determining the first preset number of possible phrases includes determining, by the processing circuitry, the first preset number of possible phrases that correspond to the language style parameters and based on the occurrence probabilities of the possible phrases.

6. The method according to claim 1, further comprising:
sending, by the processing circuitry, the candidate inputs to a terminal device of the input interface.

7. The method according to claim 1, further comprising:
displaying the candidate inputs at corresponding locations of a cursor in the input interface.

8. The method according to claim 7, wherein each of the predicted candidate sentences includes one of the first preset number of possible phrases, one of the second preset number of possible phrases, and one of a third preset number of possible phrases.

9. The method according to claim 7, wherein after the displaying the candidate inputs at the corresponding locations of the cursor in the input interface, the method further comprises:
acquiring, by the processing circuitry when the input interface is in a chat environment, one of the candidate inputs having a maximum occurrence probability when a predetermined state of a corresponding chat account is set and an automatic reply is set; and
sending, by the processing circuitry, the one of the candidate inputs having the maximum occurrence probability.

10. An electronic device, comprising:
processing circuitry configured to
acquire text that precedes and/or follows a current text input location in an input interface, the text containing less than or equal to a preset number of words;
acquire a candidate sentence based on the text which is contained in a current sentence that corresponds to the current text input location;
determine a first preset number of possible phrases for the candidate sentence based on occurrence probabilities of the first preset number of possible phrases that are determined for the candidate sentence;
connect the first preset number of possible phrases to the candidate sentence to obtain updated candidate sentences, the updated candidate sentences including a first updated candidate sentence having an end identifier and a second updated candidate sentence not having the end identifier;
determine a second preset number of possible phrases for the second updated candidate sentence that is determined not to have the end identifier, the second preset number of possible phrases being determined based on occurrence probabilities of the second preset number of possible phrases that are determined for the second updated candidate sentence;
connect the second preset number of possible phrases having the end identifiers to the second updated candidate sentence that is determined not to have the end identifier to obtain one or more additional updated candidate sentences having the end identifiers;
calculate occurrence probabilities of predicted candidate sentences having the end identifiers according to the text that precedes and/or follows the current text input location, the predicted candidate sentences including the first updated candidate sentence having the end identifier and the one or more additional updated candidate sentences having the end identifiers; and
provide a preset number of the predicted candidate sentences having the end identifiers based on the calculated occurrence probabilities of the predicted candidate sentences as candidate inputs.

11. The electronic device according to claim 10, wherein the processing circuitry is configured to
connect the first preset number of possible phrases to the candidate sentence to obtain preliminary updated candidate sentences, and
calculate occurrence probabilities of the preliminary updated candidate sentences according to the text that precedes and/or follows the current text input location; and
the updated candidate sentences include a preset number of the preliminary updated candidate sentences that are selected based on the occurrence probabilities of the preliminary updated candidate sentences.

12. The electronic device according to claim 10, wherein the processing circuitry is configured to connect the second preset number of possible phrases having the end identifiers to the second updated candidate sentence that is determined not to have the end identifier when all the second preset number of possible phrases have the end identifiers.

13. The electronic device according to claim 10, wherein the processing circuitry is configured to
calculate an accumulative update count of the candidate sentence after the first preset number of possible phrases are connected to the candidate sentence, and
connect the second preset number of possible phrases having the end identifiers to the second the updated candidate sentence that is determined not to have the end identifier when the accumulative update count of the candidate sentence reaches a set maximum value.

14. The electronic device according to claim 10, wherein the processing circuitry is configured to
acquire language style parameters of the current sentence corresponding to the current text input location, and
determine the first preset number of possible phrases that correspond to the language style parameters and based on the occurrence probabilities of the possible phrases.

15. The electronic device according to claim 10, wherein the processing circuitry is configured to send the candidate inputs to a terminal device of the input interface.

16. The electronic device according to claim 10, wherein the processing circuitry is configured to display the candidate inputs at corresponding locations of a cursor in the input interface.

17. The electronic device according to claim 16, wherein each of the predicted candidate sentences includes one of the first preset number of possible phrases, one of the second preset number of possible phrases, and one of a third preset number of possible phrases.

18. The electronic device according to claim 16, wherein the processing circuitry is configured to, after the candidate inputs are displayed at the corresponding locations of the cursor in the input interface,
- acquire, when the input interface is in a chat environment, one of the candidate inputs having a maximum occurrence probability when a predetermined state of a corresponding chat account is set and an automatic reply is set; and
- send the one of the candidate inputs having the maximum occurrence probability.

* * * * *